(12) United States Patent
James et al.

(10) Patent No.: US 11,872,879 B2
(45) Date of Patent: Jan. 16, 2024

(54) FUEL PICK-UP DEVICE

(71) Applicant: Fuel Active Limited, Taft's Well (GB)

(72) Inventors: Michael John James, South Wales (GB); Paul Graham Bateman, South Wales (GB)

(73) Assignee: FUEL ACTIVE LIMITED, Taft's Well (GB)

( * ) Notice: Subject to any disclaimer, the term of this patent is extended or adjusted under 35 U.S.C. 154(b) by 245 days.

(21) Appl. No.: 17/421,905

(22) PCT Filed: Dec. 12, 2019

(86) PCT No.: PCT/GB2019/053515
§ 371 (c)(1),
(2) Date: Jul. 9, 2021

(87) PCT Pub. No.: WO2020/144450
PCT Pub. Date: Jul. 16, 2020

(65) Prior Publication Data
US 2022/0111725 A1    Apr. 14, 2022

(30) Foreign Application Priority Data

Jan. 11, 2019 (GB) ................................. 1900419

(51) Int. Cl.
*B60K 15/077* (2006.01)
*B01D 17/02* (2006.01)
(Continued)

(52) U.S. Cl.
CPC ........ *B60K 15/077* (2013.01); *B01D 17/0217* (2013.01); *B04C 3/06* (2013.01);
(Continued)

(58) Field of Classification Search
CPC .... B60K 15/077; B01D 17/0217; B04C 3/06; B04C 3/00; B04C 2003/006; F02M 37/0082; F02M 37/24; F02M 37/50
See application file for complete search history.

(56) References Cited

U.S. PATENT DOCUMENTS

| | | | | |
|---|---|---|---|---|
| 6,666,338 B1 * | 12/2003 | Henriksson | ............... | B04C 3/06 209/208 |
| 2010/0072121 A1 * | 3/2010 | Maier | .................... | B01D 45/16 210/512.2 |
| 2016/0040639 A1 * | 2/2016 | McCarthy | .......... | F02M 37/0076 210/512.1 |

FOREIGN PATENT DOCUMENTS

| | | |
|---|---|---|
| GB | 2350337 A | 11/2000 |
| GB | 2446011 A | 7/2008 |

(Continued)

*Primary Examiner* — Liam Royce
(74) *Attorney, Agent, or Firm* — TAROLLI, SUNDHEIM, COVELL & TUMMINO L.L.P.

(57) ABSTRACT

A fuel pick-up device (10) for a fuel tank (13) has a head (11) for fitting to a wall of the tank (13), and an elongate body (14) which extends from the head (11) into the tank (13). A water separator disposed in body comprises an axially-extending separation chamber (18), and a vane (21) for creating a helical flow of fuel flowing through the chamber between an inlet (17) and an outlet (23), wherein any water in the fuel entering the separation chamber through the inlet (17) moves radially outwardly in the helical flow away from the outlet (23), the outlet (23) being arranged such that fuel drawn from the chamber (18) is substantially free of water. Water separated from the fuel is collected in a chamber (25) and can be removed via a drain (24).

5 Claims, 3 Drawing Sheets

(51) Int. Cl.
  *F02M 37/24*   (2019.01)
  *F02M 37/00*   (2006.01)
  *F02M 37/50*   (2019.01)
  *B04C 3/06*    (2006.01)
  *B04C 3/00*    (2006.01)

(52) U.S. Cl.
  CPC ........ *F02M 37/0082* (2013.01); *F02M 37/24* (2019.01); *F02M 37/50* (2019.01); *B04C 2003/006* (2013.01)

(56) References Cited

FOREIGN PATENT DOCUMENTS

| | | | | |
|---|---|---|---|---|
| JP | S52-17112 | * | 2/1977 | |
| JP | S58-119960 | * | 7/1983 | |
| JP | 2011021517 A | * | 2/2011 | |
| WO | 2010/103305 A2 | | 9/2010 | |
| WO | WO-2016022580 A1 | * | 2/2016 | ........... B01D 21/267 |
| WO | WO-2017164745 A1 | * | 9/2017 | ......... B01D 17/0217 |

\* cited by examiner

FUEL PICK-UP DEVICE

RELATED APPLICATIONS

The present invention is a U.S. National Stage under 35 USC 371 patent application, claiming priority to Serial No. PCT/GB2019/053515, filed on 12 Dec. 2019; which claims priority of GB 1900419.1, filed on 11 Jan. 2019, the entirety of both of which are incorporated herein by reference.

This invention relates to a fuel pick-up device for use in drawing fuel from a tank or other reservoir.

In conventional fuel tanks, the fuel in the tank is drawn from a pick-up point adjacent the bottom of the tank, so as to enable the pick-up of fuel even when the level of fuel in the tank is low. However, a disadvantage of this arrangement is that any water or other denser contaminant matter which has accumulated at the bottom of the tank can be drawn up with the fuel from the tank. In order to overcome this problem, the pick-up point is always some distance above the bottom the tank so that water and other contaminant matter is not drawn out from the tank. Over time, the level of the matter in the bottom of the tank will build up and thus it is necessary to regularly clean fuel tanks to alleviate the risk that the level of the matter will extend above the pick-up point. It will be appreciated that it is difficult and dangerous to clean fuel tanks. Furthermore, the fuel tank will have to be decommissioned during cleaning and this is both costly and inconvenient.

It is well known to filter fuel but a disadvantage of this is that the filter can become clogged with matter over time. Furthermore, filters are unable to remove water from the fuel.

Devices for separating water from fuel are well known. WO2010/103305 discloses once such device having an inlet for connecting to a fuel line extending from a fuel tank. The device comprises a cyclonic separator which creates a cyclonic flow of the fuel entering its separation chamber, whereby the fuel spirals downwardly around the chamber towards its lower end. As the fuel swirls inside the chamber, any denser water in the rotating airflow moves radially outward against the outside wall of the chamber, moving then to the bottom of the chamber where it is collected. The separated fuel then leaves the chamber free of water.

A problem of this arrangement is that the fuel leaving the tank is not clean and contaminants may build up and block the fuel line upstream of the separation device. Furthermore, there is a risk that additional fuel take-off lines may inadvertently be added upstream of the device. Another problem is that there may not always be space to house the separation device, for example on the forecourt of a fuel station where space is limited or on a portable tank.

With the foregoing in mind, in accordance with the present invention, there is provided a fuel pick-up device adapted for mounting to a fuel tank, the device having a head for fitting to a wall of the tank, an elongate body which, in use, extends from the head into the tank and a separator disposed in the elongate body, the separator comprising means for creating a helical flow of fuel through the device between an inlet and an outlet, wherein any denser contaminants in the fuel entering the separation chamber through said inlet move radially outwardly in the helical flow away from the outlet, the outlet being arranged such that fuel drawn from the chamber is substantially free of any denser contaminants, means being provided in the body for collecting any denser contaminants separated from the fuel.

The device is mounted to a fuel tank such that the elongate body extends towards the bottom of the tank. In use, fuel is drawn through the device before it leaves the tank, so that the fuel leaving the tank is substantially free of water or other denser contaminants. In this manner the risk of contaminants building up and blocking the fuel line from the tank is avoided. Furthermore, the any additional fuel take-off lines added downstream of the device will always draw uncontaminated fuel.

The separation device is extremely effective at removing contaminants from the fuel and fuel can be drawn from a pick-up point which is close to the bottom of the tank. In this manner, less cleaning of the tank is required.

The separator is conveniently provided in a fuel pick-up device that extends into the tank without the need for any bulky external separation device.

The means for creating a helical flow of fuel may be arranged to create a helical flow of fuel in an axially-extending separation chamber of the separator.

The inlet may be disposed at the distal end of the chamber and the outlet may be disposed at the proximal end of the chamber.

The outlet may be positioned centrally of the chamber about the rotational axis of the helical flow so that fuel is drawn from the radially innermost part of the helical flow.

The outlet may have a width which is substantially less than the width of the chamber so that it disposed radially inwardly of any separated water of other denser contaminants in the helical flow.

The means for creating a helical flow of fuel in the chamber may comprise one or more guide vanes disposed in the chamber and/or the inlet.

Alternatively or additionally, the inlet may be orientated to direct fuel tangentially of the rotational axis of the helical flow.

The vane may comprise a helical guide vane which extends longitudinally of the chamber. The axial distance between adjacent turns of the helical guide vane may decrease between the inlet and outlet, so that the rotational speed of the helical fuel flow increases towards the outlet.

In a first embodiment, the chamber comprises a tubular sidewall which constrains the helical flow of fuel, the sidewall having apertures through which the separated water can pass into a collection chamber.

In a second embodiment, the chamber comprises an inner tubular sidewall which constrains the helical flow of fuel and an outer sidewall, the outlet extending axially inside the inner tubular sidewall from the proximal end thereof, the proximal end of the sidewall being open to allow the separated water to flow into a collection chamber disposed between the inner and outer sidewalls.

In a third embodiment, the chamber comprises a tubular sidewall having a diameter which increases abruptly, such that any water in the helical flow is released into the wider portion of the chamber where it can collect.

The water collection means may be arranged to store water for removal from the device.

A duct may extend into the water collection means from the head to allow the water to be removed.

The outlet may open into an outlet chamber having a greater cross-sectional area than the outlet, such that the flow of fuel reduces and any water remaining in the flow reduces momentum and falls under the influence of gravity to a floor of the outlet chamber for collection.

A plurality of outlet chambers may be connected in series.

Also, in accordance with the present invention, there is provided an assembly comprising a fuel tank and a device as hereinbefore defined fitted to the tank.

Also, in accordance with the present invention, there is provided a method of fitting a device as hereinbefore defined to a fuel tank, the method comprising inserting the elongate body through an aperture in the tank such that the elongate body extends towards the bottom of the tank.

The method may comprise securing the head of the device to a wall of the tank.

Embodiments of the present invention will now be described by way of examples only and with reference to the accompanying drawings, in which.

Figure 1:
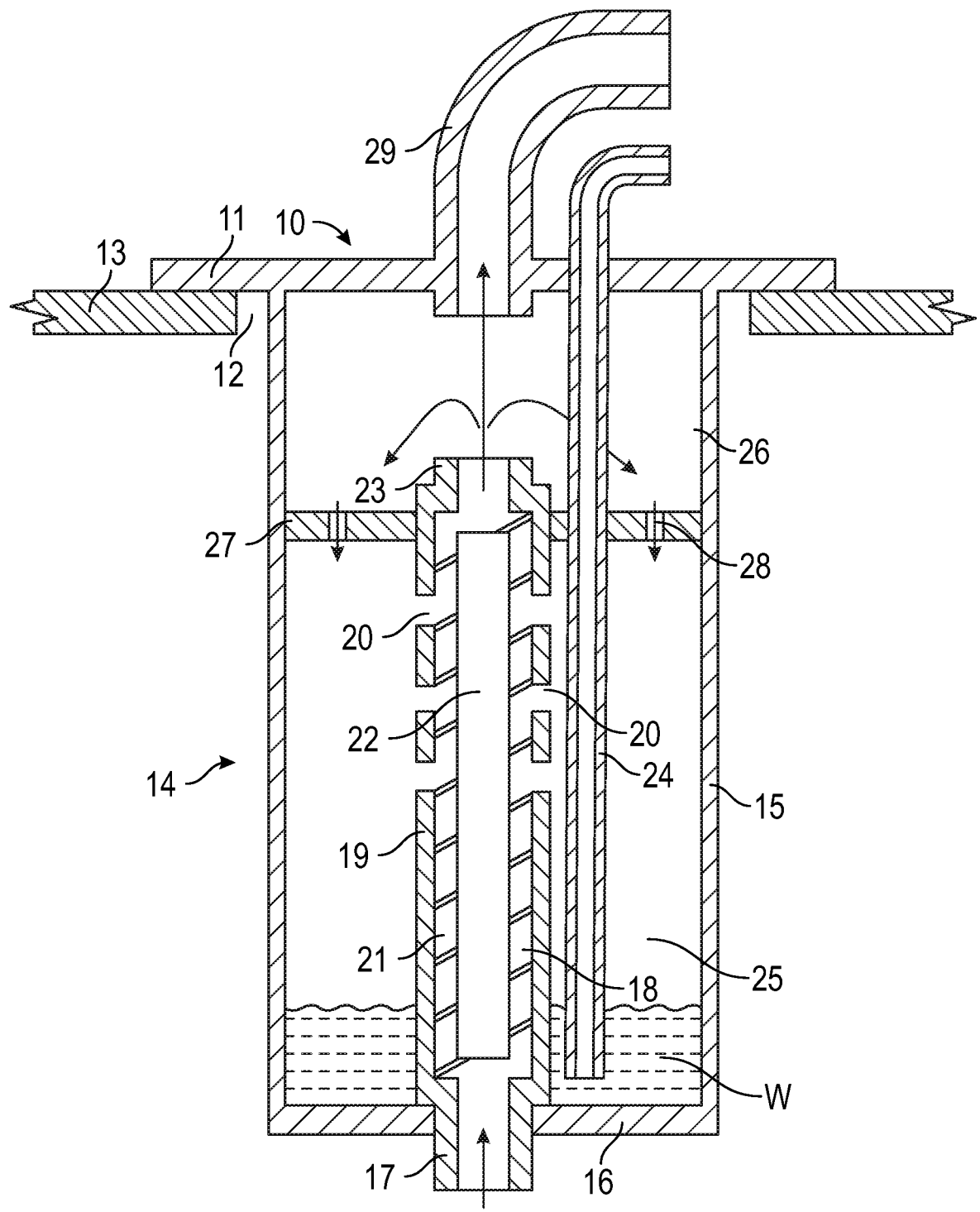
FIG. 1 is a sectional view through a first embodiment fuel pick-up device in accordance with the present invention.

Referring to FIG. 1 of the drawings, there is shown an embodiment of fuel pick-up device 10 having a flanged head 11, which is secured around its periphery to the edges of an aperture 12 formed in the upper sidewall of a fuel tank 13. The device 10 comprises an elongate tubular body 14 which extends into the tank 13 through the aperture 12 towards the bottom thereof. The body 14 defines a separator for separating any water from fuel leaving the tank through the device 10.

The tubular body 14 of the device 10 comprises a tubular sidewall 15, which is closed at its distal end by a bottom end wall 16 provided with an inlet 17 through which fuel is drawn into the device 10. The length of the tubular body 14 of the device 10 is selected so that the fuel inlet 17 is positioned adjacent the bottom wall of the tank 13. In an alternative embodiment a float device of the kind disclosed in GB2350337 or GB2446011 may be positioned below the inlet 17.

The inlet 17 opens into an elongate separation chamber 18 disposed inside the tubular body 14 of the device 10. The separation chamber 18 comprises a tubular sidewall 19 having apertures 20. A helical guide vane 21 extends longitudinally of the chamber 18 around an elongate axial support shaft 22. The proximal end of the tubular sidewall 19 of the separation chamber 18 comprises an outlet 23 aligned with the proximal end of the shaft 22.

A water drain duct 24 extends from the head 11 into a water collection chamber 25 disposed between the tubular sidewall 19 of the separation chamber 18 and the outer sidewall 15 of the body 14. The outlet 23 opens into an upper outlet chamber 26 having a greater cross-sectional area than the outlet 23. The bottom wall 27 of the outlet chamber 26 is provided with apertures 28 which open into the water collection chamber 25. An outlet port 29 on the flanged head 11 extends into the outlet chamber 26. The outlet port 29 is connected to an internal combustion engine or other device (not shown) which draws fuel from the tank 11 via the device 10.

Fuel drawn into the device 10 from the tank enters through the inlet 17, whereupon the helical guide vane 21 causes a helical flow of fuel inside the separation chamber 18 as the fuel flows towards the outlet duct 29. The tubular sidewall 19 of the chamber 18 constrains the helical flow of fuel and any (heavier) water in the helical flow moves radially outwardly and passes into the collection chamber 25 through the apertures 20 in the tubular sidewall 19 of the chamber 18. The (lighter) fuel in the helical flow is drawn radially inwardly into the apertured outlet duct 22 and onto the outlet 23.

The fuel flowing out of the outlet 23 loses momentum as it flows into the wider outlet chamber 26, such that any water remaining in the flow falls under the influence of gravity through the apertures 28 in the bottom wall 27 of the outlet chamber 26 into the water collection chamber 25. Water W collected in the collection chamber 25 can be drained from the device via the water drain duct 24.

Figure 2:
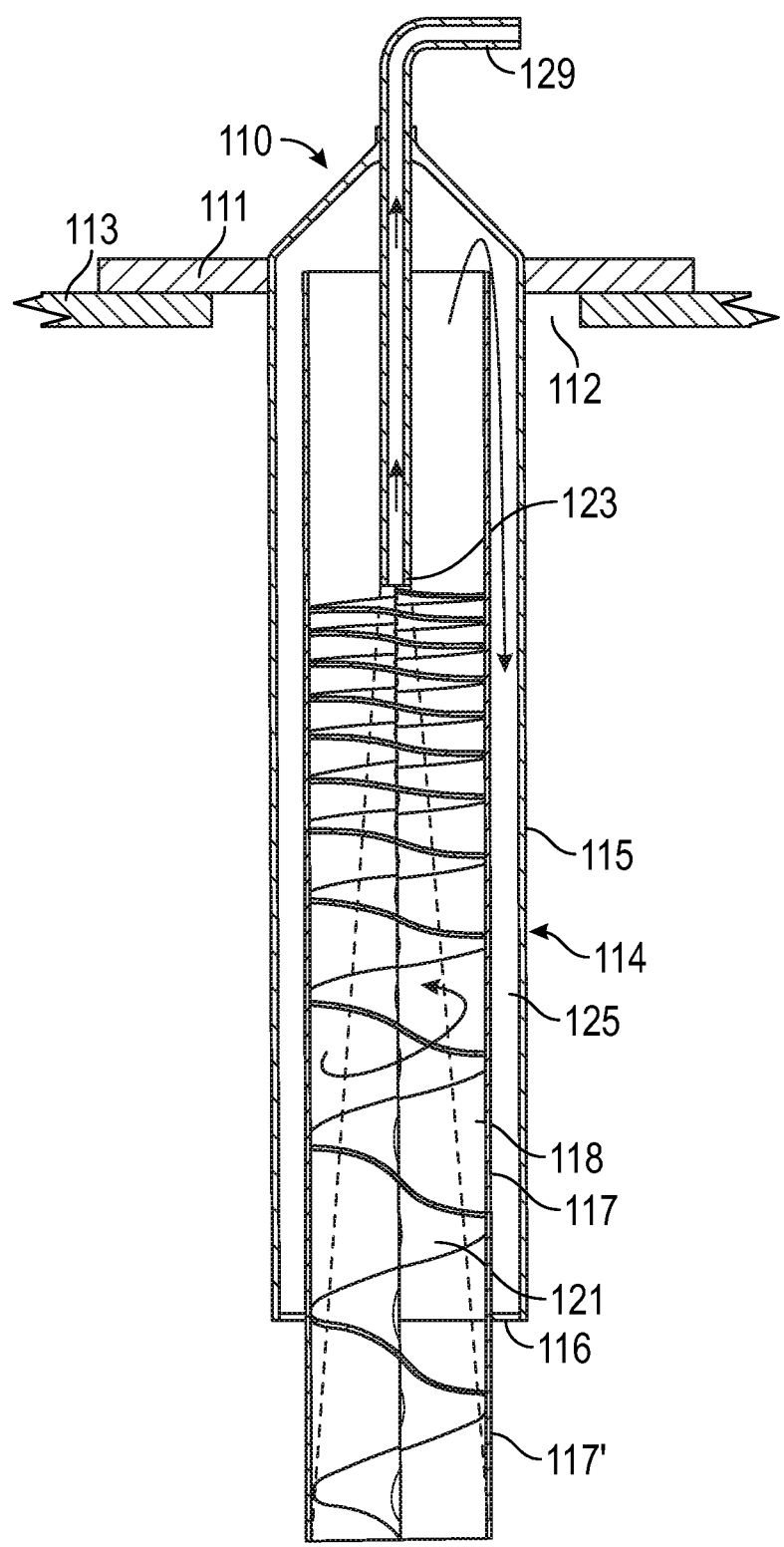
FIG. 2 is a sectional view through a second embodiment fuel pick-up device in accordance with the present invention.

Referring to FIG. 2 of the drawings, there is shown an alternative embodiment of fuel pick-up device 110 having a flanged head 111, which is secured around its periphery to the edges of a circular aperture 112 formed in the upper sidewall of a fuel tank 113. The device 110 comprises an elongate tubular body 114 which extends into the tank 113 through the aperture 112 towards the bottom thereof. The body 114 defines a separator for separating any water from fuel leaving the tank through the device 110.

The tubular body 114 of the device 110 comprises an outer tubular sidewall 115, which is closed at its distal end by a bottom end wall 116. The tubular body 114 comprises an inner tubular sidewall 117 having a distal end which extends out of the bottom end wall 116 and defines an inlet 117' through which fuel is drawn into the device 110. The length of the tubular body 114 of the device 110 is selected so that the fuel inlet 117' is positioned adjacent the bottom wall of the tank 113. In an alternative embodiment a float device of the kind disclosed in GB2350337 or GB2446011 may be positioned below the inlet 117'.

The inner tubular sidewall 117 defines an elongate separation chamber 118. A helical guide vane 121 extends longitudinally of the chamber 118. The axial distance between adjacent turns of the helical guide vane 121 decreases away from the inlet 117', so that the rotational speed of the helical fuel flow increases towards an outlet duct 123. The outlet duct 123 extends axially inside the inner tubular sidewall 117 from the proximal end thereof, the proximal end of the inner sidewall 117 being open. A water collection chamber 125 is disposed between the inner and outer sidewalls 117, 115. The outlet duct 123 is connected to an outlet port 129 on the flanged head 111. The outlet port 129 is connected to an internal combustion engine or other device (not shown) which draws fuel from the tank 111 via the device 110.

Fuel drawn into the device 110 from the tank 111 enters through the inlet 117', whereupon the helical guide vane 121 causes a helical flow of fuel inside the separation chamber 118 as the fuel flows towards the outlet duct 123. The tubular inner sidewall 117 of the chamber 118 constrains the helical flow of fuel and any (heavier) water in the helical flow moves radially outwardly against the inner sidewall 117 and is carried upwardly in a laminar flow, whereupon it flows radially outwardly and downwardly into the collection chamber 125 through the open proximal end of the inner sidewall 117. The outlet duct 123 is positioned centrally of the chamber 118 about the rotational axis of the helical flow, so that fuel free of water is drawn from the radially innermost part of the helical flow.

Figure 3:
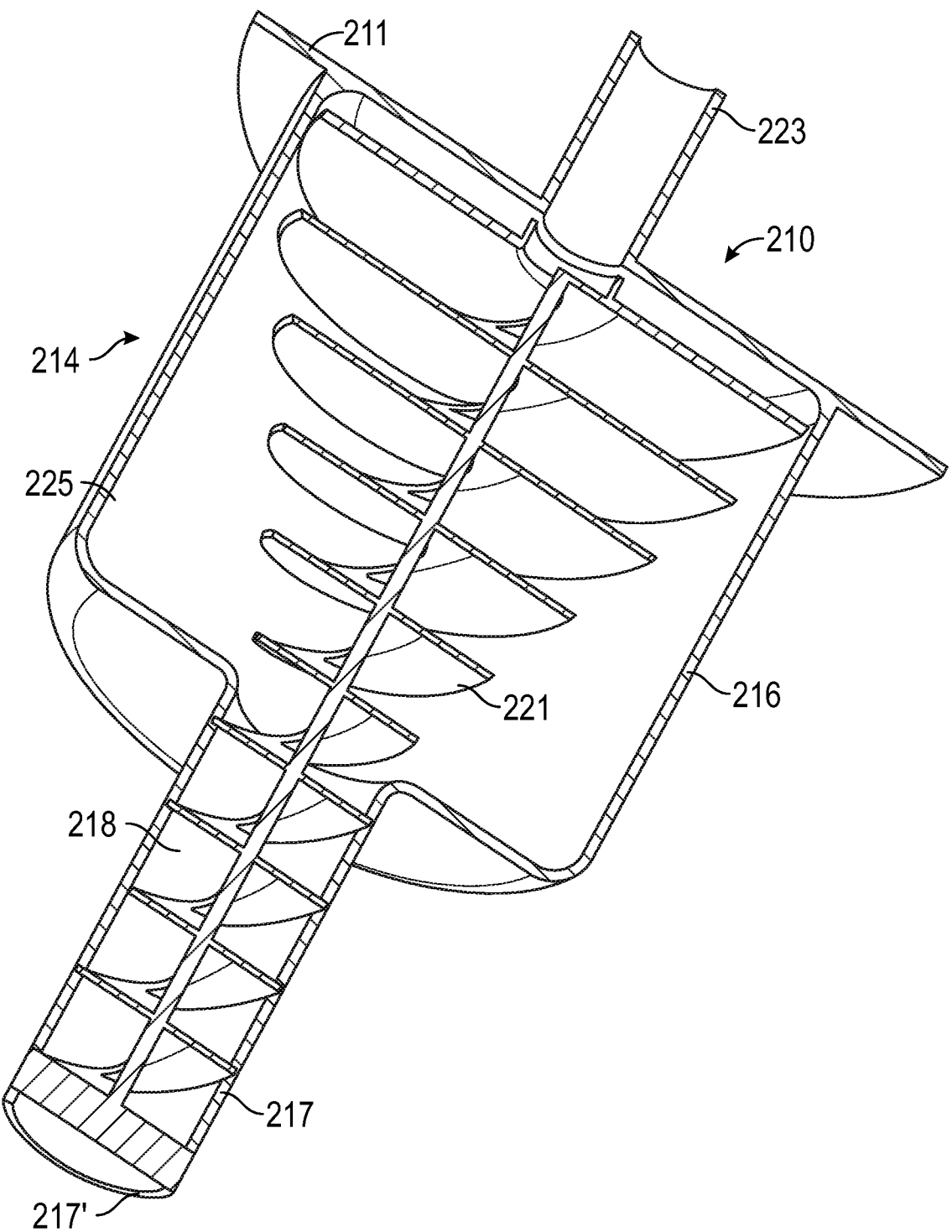
FIG. 3 is a sectional view through a third embodiment fuel pick-up device in accordance with the present invention.

Referring to FIG. 3 of the drawings, there is shown an alternative embodiment of fuel pick-up device 210 having a flanged head 211, which is secured around its periphery to the edges of a circular aperture formed in the upper sidewall of a fuel tank (not shown). The device 210 comprises an elongate tubular body 214 which extends into the tank through the aperture towards the bottom thereof. The body 214 defines a separator for separating any water from fuel leaving the tank through the device 210.

The tubular body 214 of the device 110 comprises an outer tubular sidewall which is stepped in diameter and comprises an upper portion 216 which is of a greater diameter than a lower portion 217. The distal end of the lower portion 217 defines an inlet 217' through which fuel is drawn into the device 210. The length of the tubular body 214 of the device 210 is selected so that the fuel inlet 217' is positioned adjacent the bottom wall of the tank. In an alternative embodiment a float device of the kind disclosed in GB2350337 or GB2446011 may be positioned below the inlet 217'.

The tubular sidewall of the device 210 defines an elongate separation chamber 218. A helical guide vane 221 extends longitudinally of the chamber 218. The diameter of the turns of the helical guide vane 221 increases away from the inlet 217' towards an outlet duct 223. The outlet duct 223 forms an outlet port on the flanged head 211 which is connected to an internal combustion engine or other device (not shown) which draws fuel from the tank via the device 210.

Fuel drawn into the device 210 from the tank enters through the inlet 217', whereupon the helical guide vane 221 causes a helical flow of fuel inside the separation chamber 218 as the fuel flows towards the outlet duct 223. The lower portion 217 of the tubular sidewall of the device constrains the helical flow of fuel and any (heavier) water in the helical flow moves radially outwardly against the inner sidewall and is carried upwardly in a laminar flow towards the upper portion 216, whereupon it flows radially outwardly into a radial region 225 where it can be collected and drained. The outlet duct 223 is positioned centrally of the chamber 218 about the rotational axis of the helical flow, so that fuel free of water is drawn from the radially innermost part of the helical flow.

The present invention thus provides a fuel pick-up device 10 which is simple and inexpensive in construction yet enables fuel to be reliably drawn from fuel tank without the risk of water or other contaminants.

The invention claimed is:

1. A fuel pick-up device mountable to a fuel tank, the device having a head fittable to a wall of the tank, an elongate body which, in use, is configured to extend from the head into the tank and a separator disposed in the elongate body, the separator comprising an axially extending separation chamber, means for creating a helical flow of fuel through the device between an inlet and an outlet and within the separation chamber, wherein the inlet is disposed at a distal end of the separation chamber and the outlet is disposed at a proximal end of the separation chamber and centrally of the separation chamber, about a rotational axis of the helical flow of fuel, wherein the outlet has a width which is substantially less than the width of the separation chamber, wherein the means for creating a helical flow of fuel comprises at least one guide vane disposed in the separation chamber, the at least one guide vane extending longitudinally of the separation chamber, wherein any denser contaminants in the fuel entering the separation chamber through said inlet move radially outwardly in the helical flow away from the outlet, the outlet being arranged such that fuel drawn from the separation chamber is substantially free of any denser contaminants, means being provided in the elongate body for collecting any denser contaminants separated from the fuel, and wherein the separation chamber comprises an inner tubular sidewall which constrains the helical flow of fuel and the elongate body comprises an outer sidewall, the outlet extending axially inside the inner tubular sidewall from the proximal end thereof, the inner tubular sidewall comprising apertures through which the separated water passes into a collection chamber disposed between the inner tubular sidewall of the separation chamber and the outer sidewall of the elongate body.

2. The fuel pick-up device as claimed in claim 1, in which the water collection chamber is arranged to store water for removal from the device.

3. The fuel pick-up device as claimed in claim 1, in which a duct extends into the water collection chamber from the head to allow the water to be removed.

4. The fuel pick-up device as claimed in claim 1, in which the outlet opens into an outlet chamber having a greater cross-sectional area than the outlet.

5. An assembly comprising a fuel tank and the fuel pick-up device fitted to the tank, the fuel pick-up device being a device as claimed in claim 1.

* * * * *